United States Patent [19]

Nguyen et al.

[11] Patent Number: 5,327,513
[45] Date of Patent: Jul. 5, 1994

[54] FLAT CABLE

[75] Inventors: Phu D. Nguyen, San Jose; Ashok K. Mehan, Union City; Hans E. Lunk, Menlo Park; James M. O'Brien, Fremont, all of Calif.

[73] Assignee: Raychem Corporation, Menlo Park, Calif.

[21] Appl. No.: 890,045

[22] Filed: May 28, 1992

[51] Int. Cl.[5] .................................................. G02B 6/44
[52] U.S. Cl. .................................... 385/114; 156/55; 174/34; 174/117 A; 174/117 F
[58] Field of Search ............... 174/117 F, 117 FF, 34, 174/36, 117 A; 156/55; 385/114

[56] References Cited

U.S. PATENT DOCUMENTS

| 3,613,230 | 10/1971 | Griff | 174/117 FF |
|---|---|---|---|
| 3,819,848 | 6/1974 | Fry | 174/117 F X |
| 3,836,415 | 9/1974 | Hilderbrandt | 174/117 F X |
| 4,000,348 | 12/1976 | Harlow | 174/110 FC |
| 4,045,750 | 8/1977 | Marshall | 174/117 FF X |
| 4,113,335 | 9/1978 | Long et al. | 389/29 R |
| 4,157,452 | 6/1979 | Pignataro et al. | 174/36 |
| 4,165,559 | 8/1979 | Lang et al. | 29/629 |
| 4,183,010 | 1/1980 | Miller | 367/154 |
| 4,381,426 | 4/1983 | Cronkite et al. | 174/117 F |
| 4,478,778 | 10/1984 | Look | 264/146 |
| 4,501,929 | 2/1985 | Escallier et al. | 174/117 F |
| 4,538,024 | 8/1985 | Wise et al. | 174/117 F |
| 4,548,661 | 10/1985 | Escallier et al. | 156/52 |
| 4,616,717 | 10/1986 | Luetzow | 174/117 F |
| 4,625,074 | 11/1986 | Cox | 174/117 F |
| 4,626,298 | 12/1986 | Allard | 174/117 F X |
| 4,678,709 | 7/1987 | Tondre et al. | 428/380 |
| 4,678,864 | 7/1987 | Cox | 174/36 |
| 4,711,811 | 12/1987 | Randa | 428/383 |
| 4,767,891 | 8/1988 | Biegon et al. | 174/34 |
| 4,783,578 | 11/1988 | Bodensiek et al. | 174/117 F |
| 4,926,007 | 5/1990 | Aufderheide et al. | 174/36 |
| 5,030,794 | 7/1991 | Schell et al. | 174/36 |
| 5,076,881 | 12/1991 | Ferguson | 174/117 F X |
| 5,142,105 | 8/1992 | Kihlken et al. | 174/112 |
| 5,268,531 | 12/1993 | Nguyen et al. | 174/117 F X |
| 5,276,759 | 1/1994 | Nguyen et al. | 174/117 F X |

FOREIGN PATENT DOCUMENTS 39190 3/1977 Japan .................... 174/117 A

Primary Examiner—Morris H. Nimmo
Attorney, Agent, or Firm—Sheri M. Novack; Herb Burkard

[57] ABSTRACT

This invention relates to flat cables comprising a plurality of substantially parallel insulated conductors bonded to a polymeric substrate which has a melting point greater than 200° C. and/or a thickness less than 2.5 mils (98 microns) and a method for the production of such cables.

32 Claims, 3 Drawing Sheets

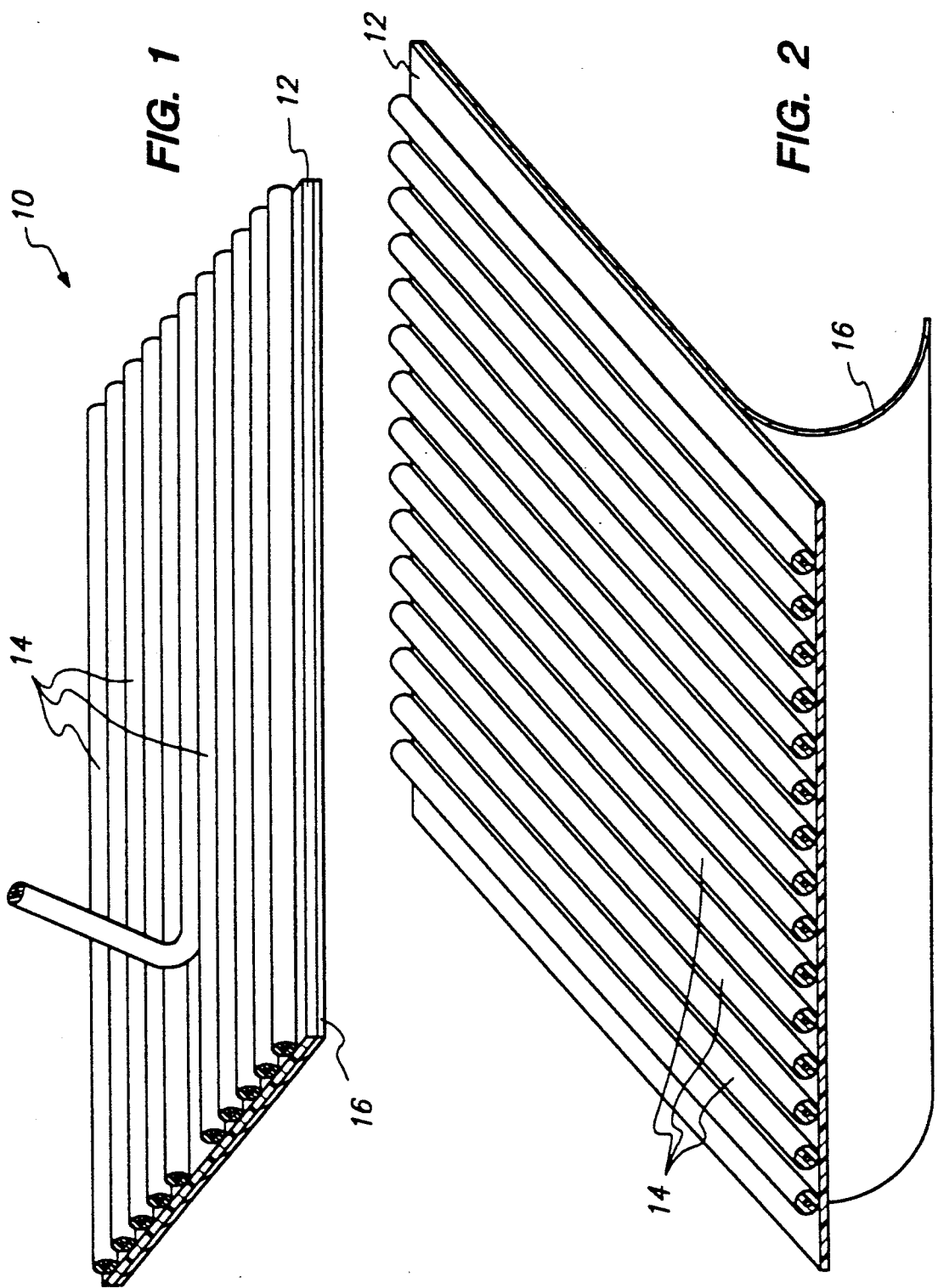

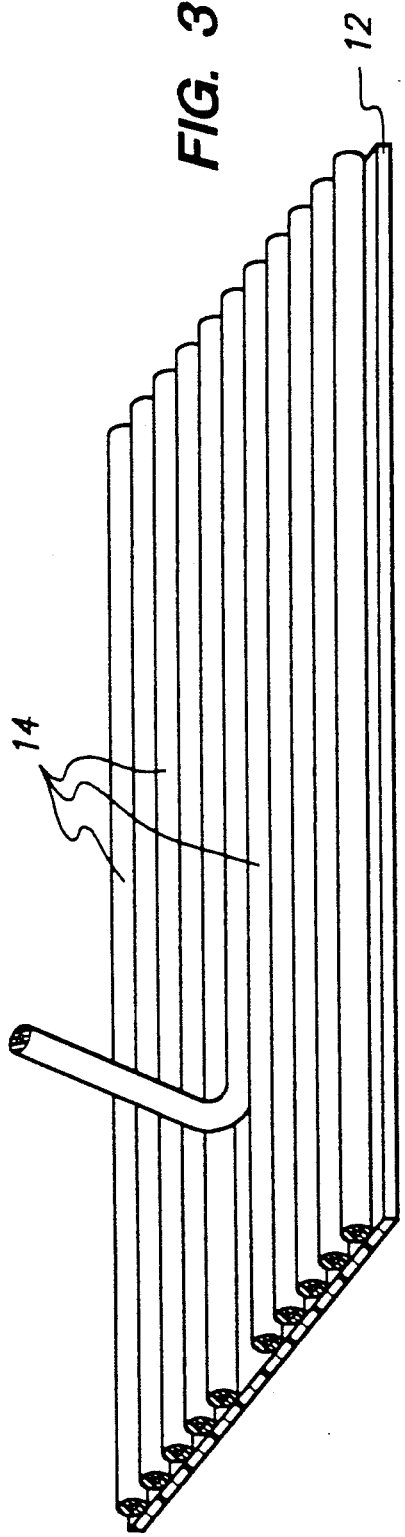
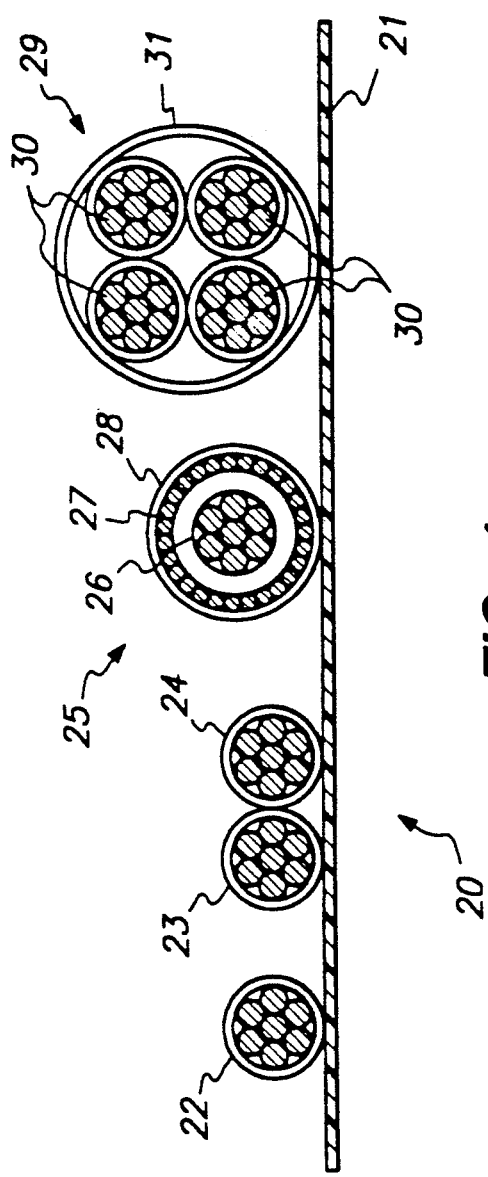

FLAT CABLE

BACKGROUND OF THE INVENTION

This invention relates to flat cable and in particular flat cable comprising a plurality of conductors and a substrate comprising a polymeric material.

Flat cables are well known and take several forms. In one form of flat cable a plurality of conductors are placed parallel to one another and laminated between a pair of films which surround each conductor thereby insulating each conductor from its neighbors as well as forming the flat cable construction. The insulation thickness of each individual conductor cannot always be controlled as precisely and reproducibly as desired.

Another form of flat cable, in which pre-insulated conductors are bonded to a carrier film, addresses this problem. The film is generally of a polymeric material similar to that of the insulation and in order to achieve a bond between the insulated conductors and the film, the film must be heated to about its melting point. At these temperatures it is difficult to maintain the dimensions of the film and this can lead to improper alignment of the wires and even buckling and shrinking of the film. Further, it has been found that with certain polymeric materials it is difficult to separate an individual insulated conductor from the carrier film unless the bond strength is well controlled. If the bond is too strong, peeling will then destroy the carrier film or the conductor insulation. It is desirable to be able to peel the individual insulated conductors from the film as cleanly as possible. All such problems, we have discovered, are prevalent, and sometimes unavoidable using prior art methods, when polymer film is heated above its melting point to enhance adhesion, especially when polymer film has a high melting point, for example, over 200° C. or when the film is thin, for example less than 2.0 mil. We have also discovered that, for optimum adhesion, the film should be heated to a higher temperature close to the ring and ball softening temperature of the polymer material. We have also found that when using prior art methods of thermal bonding at a sufficiently high temperature to ensure good adhesion, the bond strength between the cable insulation and the carrier film varies erratically and even under nominally identical process conditions, the average bond strength can vary widely from one production run to the next.

U.S. Pat. Nos. 4,625,074 and 4,678,864 to Cox, and 4,767,891 to Biegon et al. describe attempts to obtain a flat cable having dimensional stability at elevated temperatures during the manufacture of the cable. These patents disclose the use of a carrier film comprising a laminate of an attachment layer of a first polymeric material and a dimensional stabilization layer of a material having a higher melting point than the first polymeric material. The attachment layer and the dimensional stabilization layer are joined together with an adhesive layer. In use, the dimensional stabilization layer remains part of the flat cable, the attachment layer serving merely as a bonding layer and the flat cable can therefore delaminate if the cable is subject to temperatures above the melting point of the adhesive or attachment layer.

U.S. Pat. No. 4,678,864 to Cox also discloses the use of a ground plane in the construction of a flat cable assembly. The ground plane is positioned between the flat cable and a plastic covering. The plastic covering is coated over a major portion of its surface with a release agent so that it can be readily separated from the cable. The ground plane itself is not bonded to the flat cable. The flat cable itself is of conventional structure comprising a supporting film and insulated wires and thus it would be difficult to peel individual insulated wires cleanly from the cable.

This application is related to copending, commonly assigned, U.S. application No. MP1441-US1, Ser. No. 07/847,558, filed Mar. 6, 1992.

OBJECTS AND SUMMARY OF THE INVENTION

It is an object of this invention to provide flat cables having a desired preselected and reproducible bond strength between the insulated conductors and the carrier film with only minor variance of bond strength between one conductor or another and the carrier film together with a method for producing such cables. Another object of this invention is to provide flat cables in which insulated conductors are bonded to carrier films of a thickness of less than 2.5 mil (98 microns) at a desired preselected spacing and also a method for providing such cables. Yet another object of this invention is to provide flat cables in which high melting insulations are bonded to high melting carrier films at a desired preselected spacing and also a method for providing such cables.

This invention provides a flat cable having dimensional stability and consistent bond strength with good peelability of the constituent insulated conductors, that is the ability to readily and cleanly separate one or more of the individual conductors from a carrier film (polymeric substrate) more than 1 mil (39.4 microns) thick (thinner carrier films generally fail cohesively if separation is attempted).

One aspect of this invention comprises a flat cable comprising:

(a) a plurality of elongated conductive components each individually surrounded with an outer layer of a first polymeric material; and (b) a substantially planar substrate comprising a second polymeric material capable of bonding to the first polymeric material;

(c) the first polymeric material and the second polymer material, which may be the same or different, being selected from thermoplastic polymers having a melting point greater than 200° C.; the conductors being bonded to a surface of the substrate and arranged substantially parallel to each other at a predetermined spacing.

A second aspect of this invention comprises a flat cable having:

(a) a plurality of elongated conductive components each individually surrounded with an outer layer of a first polymeric material; and (b) a substantially planar substrate comprising a second polymeric material capable of bonding to the first polymeric material and having a thickness less than 2.5 mil (less than 98 microns);

(c) the first polymeric material and the second polymer material, which may be the same or different, being selected from thermoplastic polymers;

the insulated conductors being bonded to a surface of the substrate and arranged substantially parallel to each other at a predetermined spacing.

A third aspect of this invention comprises a method of preparing a flat cable which comprises;

(a) arranging a plurality of elongate conductive components each individually surrounded by a layer of a first polymeric material, substantially parallel to one another;

(b) providing a substantially planar polymeric substrate mounted on a surface of a support layer peelably adhered to the polymeric substrate, the support layer comprising a material that is dimensionally stable at a selected temperature at which the substrate and first polymeric material can be caused to adhere to one another;

(c) heating the conductors or the substrate or both to a selected temperature;

(d) bringing the conductors in contact with the substrate;

(e) cooling the resulting assembly;

(f) removing the support layer from the assembly.

A fourth aspect of the invention provides a flat cable produced by the method of the third aspect of the invention.

A fifth aspect of this invention comprises a method of preparing a flat cable comprising a plurality of elongated conductive components each individually surrounded by a layer of a first polymeric material that is bonded to a polymeric substrate and having a preselected bond strength thereto, which comprises:

(a) arranging the plurality of elongated conductive components each individually surrounded by a layer of a first polymeric material, substantailly parallel to one another;

(b) providing the polymeric substrate mounted on a surface of a support layer peelably adhere to the polymeric substrate, the support layer comprising a material that is dimensionally stable at a selected temperature at which the substrate and first polymeric material can be caused to adhere to one another;

(c) heating the insulated conductors or the substrate or both to a selected temperature;

(d) bringing the insulated conductors into contact with the substrate at a predetermined pressure;

(e) cooling the resulting assembly;

(f) removing the support layer from the assembly, whereby the insulated conductors manifest the preselected bond strength to the polymeric substrate.

A sixth aspect of the invention provides a flat cable produced by the method of the fifth aspect of the invention.

BRIEF DESCRIPTION OF THE DRAWINGS

FIG. 1 illustrates a flat cable of this invention adhered to a support layer.

FIG. 2 shows the support layer being peeled away from the polymer substrate of the flat cable.

FIG. 3 illustrates a flat cable of this invention.

FIG. 4 is a cross section of another cable of this invention in which a number of different types of conductors are bonded to the substrate.

DETAILED DESCRIPTION OF THE INVENTION

Figure 5:
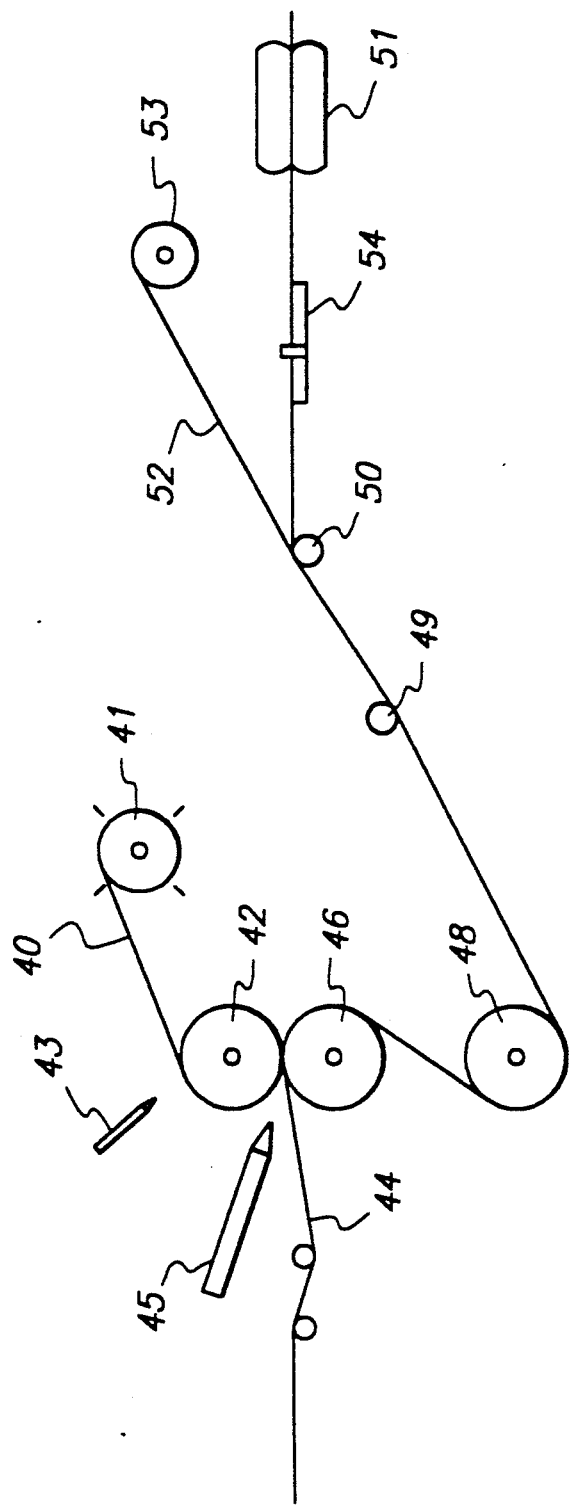
FIG. 5 illustrates a method for the manufacture of the flat cable of this invention.

The flat cable of this invention comprises a plurality of conductors, each individually surrounded by a layer of a first polymeric material, bonded to a polymeric substrate. FIG. 1 illustrates a flat cable of this invention in which each conductor comprises an insulated electrical conductor. In FIG. 1 flat cable 10 comprises a polymeric substrate 12, peelably adhered to a support layer 16, and individually insulated conductors 14. In FIG. 1, the conductors are identical. FIG. 2 shows the support layer 16 being peeled away from the polymeric substrate 12. FIG. 3 shows the flat cable after removal of the support layer.

The individual electrical conductors can be single or multiple stranded conductors. In other embodiments, one or more of the conductors comprises a twisted pair, i.e. a pair of individually insulated conductors twisted together, a cable, i.e. one or more insulated conductors within an outer jacket, including coaxial cables in which one of the conductors surrounds an inner insulated conductor. This is illustrated in FIG. 4, in which flat cable 20 comprises substrate 21 which carries an insulated wire 22, a twisted pair of wires 23 and 24, a coaxial cable 25 comprising inner conductor 26, outer conductor 27 surrounded by jacket 28 and a cable 29 comprising four individual wires 30 surrounded by jacket 31.

In further embodiments of the invention, the conductor comprises an optical fiber surrounded with a layer of polymeric material (typically the jacket of a fiber optic cable). Thus, the term conductor is used herein to encompass a variety of possible arrangements of electrical conductors as well as optical fiber cables or individual optical fibers surrounded with a protective polymeric material. For the sake of convenience, the term insulated conductor is used herein to refer to any conductor or conductor arrangement surrounded by a layer of polymeric material.

The conductor is surrounded with a layer of a first polymeric material. The conductor can be surrounded by additional layers of polymeric material as long as the outer most layer comprises the first polymeric material. The first polymeric material preferably has a melting point of at least 200° C. and is preferably, for example, selected from ethylene-tetrafluoroethylene copolymers (including terpolymers), ethylene-trichlorofluoroethylene copolymers, polyethylene terephthalate, polybutylene terephthalate, polyamides, in particular, aliphatic polyamides, aromatic polyamides, polyimides, polyarylene ethers and the like. The first polymeric material may be crosslinked if desired to provide improved properties, particularly at elevated temperatures. If the polymeric substrate has a thickness less than 2.5 mil (less than 98 microns) the first polymeric material can be, for example, polyvinyl chloride, polyethylene terephthalate, polybutylene terephthalate, polyethylene, polyvinylidene fluoride, ethylene-tetrafluoroethylene copolymers (including terpolymers), ethylene-trichlorofluoroethylene copolymers, polyamides, in particular, aromatic polyamides, polyimides and the like. Here too, the first polymeric material may be crosslinked if desired to provide improved properties, particularly at elevated temperatures.

In a preferred embodiment, the conductor is an electrical conductor which is insulated by at least one surrounding layer of a first polymer comprising an ethylene-tetrafluoroethylene copolymer.

In accordance with this invention the insulated conductors are arranged parallel to one another and bonded to a polymeric substrate capable of bonding to the first polymeric material. The polymeric substrate comprises a second polymeric material capable of bonding to the first polymeric material that surrounds the conductors to be formed into the flat cable. Preferably the second polymeric material is of the same polymer as the first polymeric.

Second polymeric materials for use in the polymeric substrate, having a melting point of at least 200° C. as described in the first aspect of the invention, are preferably selected, for example, from ethylene-tetrafluoroethylene copolymers (including terpolymers), ethylene-trichlorofluoroethylene copolymers, tetrafluoroethyleneperfluoroalkoxy vinyl ether copolymers polyamides, in particular, aromatic polyamides, polyimides, polyarylene ethers and the like. In this aspect of the invention, the second polymer material is preferably at least partly crystalline and/or has a melting point of at least 225° C., more preferably a melting point of at least 240° C., most preferably a melting point of at least 260° C. The polymeric substrate in this first aspect of the invention is preferably from about 10 to about 200 microns thick, more preferably about 20 to about 150 microns. If the polymer is at least partly crystalline, the melting point is the crystalline melting point.

Preferred second polymeric materials formed into a polymeric substrate having a thickness less than 2.5 mils (less than 98 microns), according to the second aspect of the invention, are, for example, polyvinyl chloride, polyethylene, polyethylene terephthalate, poly(butylene terephthalate), vinylidene fluoride homopolymers and copolymers, ethylene-tetrafluoroethylene copolymers (including terpolymers), ethylene-trichlorofluoroethylene copolymers, tetrafluoroethylene-perfluoroalkoxy vinyl ether copolymers, polyamides, in particular, aromatic polyamides, polyimides including aliphatic polyimides, polyesters, and the like. In this aspect of the invention the polymeric substrate is preferably about 0.25 to about 2.4 mils thick (10 to 95 microns), for example, 0.25 to 2 mils (10 to 78 microns) thick, more preferably 0.25 to 1.5 mils (10 to 59 microns), for example, 0.5 to 1.0 mils (20 to 40 microns) thick. A particular advantage of flat cables bonded to polymeric substrates much less than 2.5 mils (much less than 98 microns) is that they can be curved in the plane of the flat cable (to form half "meanders") without having to fold the cable to equalize intra-conductor stresses because, in this thickness range, substrate stretching and distortion can accommodate the differing circumference of curvature between inner and outer conductors around the curve. The exact substrate thickness at which it becomes possible to curve the flat cable in the plane of the flat cable depends on the conductor diameter and center to center spacing but in general this advantage is manifested in cables having polymeric substrates of a thickness of 1 mil (39.4 microns) or less. Moreover cables with thin polymeric substrates can be "accordioned" transversely so as to fit into, for example, narrower channels or apertures and only spread out to their full width where they enter a connector.

Substantially parallel means that a first conductor of a flat cable of the invention does not deviate from parallelism to an adjacent second conductor of the flat cable by more than 1% (percent) of the spacing therebetween. In one preferred embodiment of the flat cables of the invention, such substantial parallelism with substantial absence of sagging or buckling of the polymeric matrix is maintained along a length of flat cable of at least 24 inches (61 cm); more preferably such substantial parallelism with substantial absence of sagging or buckling of the polymeric matrix is maintained along a length of flat cable of at least 60 inches (152.4 cm); most preferably such substantial parallelism with substantial absence of sagging or buckling of the polymeric matrix is maintained along a length of flat cable of at least 120 inches (305 cm). In another preferred embodiment of the invention such substantial parallelism with substantial absence of sagging or buckling of the polymeric matrix is maintained along a length of flat cable of at least 50 feet (1524 cm).

Preferably in a flat cable in accordance with the invention, having a first and a second edge and comprising n parallel insulated conductors, where n is an integer ranging from 2 to 100, wherein a first conductor is the nearest conductor to the first edge of the cable and a nth conductor is the nearest to the second edge, the center to center spacing between any two adjacent conductive conductors of the flat cable and the cumulative spacing between a first conductor and a nth conductor is held to within 1% of the desired selected spacing therebetween along a length of flat cable equal to at least 24 inches (61 cm). More preferably the center to center spacing between any two adjacent conductive conductors of the flat cable and the cumulative spacing between a first conductor and a nth conductor is held to within 0.5% of the desired selected spacing therebetween. Most preferably the center to center spacing between any two adjacent conductive conductors of the flat cable and the cumulative spacing between a first conductor and a nth conductor is held to within 0.1% of the desired selected spacing therebetween. More preferably the desired spacing between any two adjacent conductive conductors of the flat cable and the cumulative spacing between a first conductor and a nth conductor is held to within a selected limit over a length of flat cable of at least 60 inches (152.4 cm). Most preferably the desired spacing between any two adjacent conductive conductors of the flat cable and the cumulative spacing between a first conductor and a nth conductor is held to within a selected limit over a length of flat cable of at least 50 feet (1524 cm).

The support layer of the third (method) aspect of the invention is a material that is dimensionally stable at least at the temperature at which the first and second polymeric layers are heated so as to cause them to adhere together. Furthermore the adhesion between the support layer and the substrate film material must be sufficiently secure at the temperature at which the first and second polymeric layers are caused to adhere together that the bond therebetween remains integral such that the dimensions of the second polymeric layer remain substantially unchanged (except for thermal expansion effects) during the steps of heating one or both of, and contacting, the first and second polymeric layers. Moreover, the adhesion between the second polymeric layer and the support layer should be sufficient at all times during the process that the overall dimensions of the second polymeric layer remain substantially unaffected by performing the steps of the method of the invention. Preferably, the temperature at which the first and second polymer materials are caused to adhere together is at least about the melting point of the lower melting material, more preferably at least about the ring and ball softening temperature of the lower melting material. The support layer of this aspect of the invention is any film of material dimensionally stable at least at the temperature at which the first and second polymeric layers are caused to adhere together. Preferred support layers comprise materials selected from high temperature polymers such as polyimide and metals such as aluminum, nickel, copper, iron and the like. The support layer may be peelably adhered to the polymeric substrate by melt bonding above the melting point of the polymeric substrate, extrusion lamination or by adhesive bonding with an adhesive layer or any combination thereof. Preferred adhesives are polyesters, polyurethanes, epoxies and polyacrylics. A preferred polymeric substrate is a film of ethylenetetrafluoroethylene copolymer. Preferred support layers include thin films of aluminum or Kapton peelably adhered to the ethylenetetrafluoroethylene copolymer film with a thin intervening layer of an adhesive, for example, a polyester (polyethylene terephthalate). After removal of the support layer in the method of the invention the adhesive layer, if used, may adhere to one or both of the support layer and the polymeric substrate. Preferably the adhesive layer, if used, adheres to the support layer more strongly than to the polymeric substrate so that both support and adhesive layers are peeled away together from the polymeric substrate.

Unexpectedly, we have discovered that provision of a support layer, especially a metallic support layer, considerably improves the consistency and reproducibility of the bond obtained between individual insulated conductors and the polymeric substrate. In fact, using the methods of this invention, an operator making flat cables is able, for the first time, to select a contact pressure between the insulated conductors and the polymeric substrate at a particular bonding temperature and consistently and reproducibly obtain thereby a desired bond strength between the conductors and the substrate. Such consistent, reproducible and selectable bond strengths are highly desirable, especially if the cables are to be used in automated terminating and cable handling equipment. Thus the fifth aspect of the invention describes and defines with particularity how a cable, having these desirable characteristics, may be obtained. When practicing this aspect of the invention the operator determines the appropriate bonding temperature and pressure to obtain the desired bond strength by routine experimentation, for example by contacting the insulated conductor and polymeric substrate at a selection of pressures at a desired temperature or by varying the temperature at a desired contact pressure, then cooling the experimental assembly and measuring the bond strength. In most instances it will be advantageous to carry out the experimentation using the production bonding equipment. Once these operating parameters have been established the operator can then set the requisite temperatures and pressures, confident that the bonding process will operate to produce a flat cable having consistent bond strengths both between and within individual runs.

Flat cables of the invention are preferably assembled by arranging the conductors in the desired parallel relationship. Adjacent insulated conductors can be touching each other or spaced apart from each other, as desired. The substrate and/or the conductors are heated to about the melting point of the impregnating second polymeric material just prior to bringing the conductors and substrate into contact. The insulated conductors are then placed into contact with a face of the polymeric substrate opposite to that which is adhered to the support layer. Sufficient pressure is applied to effect bonding with the desired bond strength. The amount of pressure applied should be about 1 to about 40 psi, preferably about 5 to about 20 psi. The assembly is then permitted to cool. Once the flat cable has cooled to the extent that the polymeric substrate, the insulation around the conductors and the bond therebetween have sufficient strength to resist permanent deformation, the support layer may be removed (peeled away) from the polymeric substrate.

By following the teachings of the invention one can provide flat cables in long lengths suitable for use in flat cable terminations and connectors that are made from polymeric substrates of sufficient thinness that the flat cable is more flexible than flat cables of the prior art and/or can be provided using materials capable of operating at higher temperatures than that contemplated in such applications by the prior art. Furthermore, provision of a peelable metal support layer in one preferred embodiment of the method of the invention enables good temperature uniformity to be maintained across the conductors and polymeric substrate during the heating step prior to contact therebetween. Thus temperature control is facilitated and the temperature of the heating means may be reduced if desired. Moreover, through use of a metal support substrate and/or thinner polymeric substrates of the invention, more rapid cooling of the adhered assembly is facilitated, reducing the tendency of some polymeric substrates to be embrittled in the flat cable.

EXAMPLE 1

The polymeric substrate used in this example is a 2 mil film of an ethylene-tetrafluoroethylene (ETFE) copolymer, Tefzel ™ 280, 3 inches wide, prelaminated to a 1 mil aluminum foil support layer by a low bond strength adhesive. The substrate and support layer together weigh 4.42 oz. per square yard with a total thickness of 3.25 mils. The following bonding procedure is carried out using the equipment shown in FIG. 5. The substrate 40 is paid off from a spool 41 and wound around roller 42 with the polymeric substrate film side facing toward the hot air blowers 43 and 45 where it is heated to its melting point. The substrate is then brought in contact with 20 MIL-W-84585/5-24 primary wires arranged horizontally in a single layer 44. The bonding is achieved by passing the heated substrate and the wires between rollers 42 and 46 where the Polymeric substrate layer is fused to the wires under an applied pressure of approximately 20 psi. The laminate is then wound around roller 48, and through a set of wire guides 49 and 50 to the caterpillar take up 51. The aluminum foil 52 is peeled off and discarded by a take up spool 53. Excess polymeric substrate film on both sides of the flat cable is trimmed off with an in-line slitter 54. The finished flat cable has a 2 mil ETFE copolymer film backing which still exhibits a tear strength of 2 lbs when tested in accordance with ASTM-D-1004.

EXAMPLE 2

Example 1 is repeated using as the polymeric substrate for the flat cable a 0.5 mil Tefzel 280 film prelaminated to a 1 mil Kapton ™ film support layer. The total substrate weights 1.65 oz. per square yard with a thickness of 1.5 mils. The bonding operation is carried out using the procedure and equipment as described in Example 1 with the 0.5 mil polymeric substrate layer being fused to a 2 inch wide set of 20 MIL-W-84585/5-24 wires. The support layer (Kapton film) 52 is then peeled off and discarded by a take up spool 53. Excess polymeric substrate film on both sides of the bonded cable is trimmed off with an in-line slitter 54. The finished flat cable is very flexible and has a 0.5 mil Tefzel film backing.

EXAMPLE 3

This example illustrates how the peel strength of the insulated conductor from the film may be controlled reproducibly by selecting different bonding pressures. Example 1 is repeated using as the polymeric substrate for the flat cable a 5 mil Tefzel 280 film pre-laminated to a 1 mil aluminum foil by a low bond strength adhesive. The bonding pressure is set by varying the pressure applied to the insulated conductors and polymeric substrate between, for example, rollers 42 and 46 of FIG. 5. At an applied pressure of 20 psi, an average peel strength of about 0.4 lbs was consistently obtained between the insulated cables and the polymeric substrate, when tested in a 180° peel test in accordance with ASTM D903. At 30 psi and at 40 psi applied pressure, average peel strengths of about 0.8 lbs and about 1.2 lbs respectively were consistently and reproducibly obtained.

While the invention has been described herein in accordance with certain preferred embodiments thereof, many modifications and changes will be apparent to those skilled in the art. Accordingly, it is intended by the appended claims to cover all such modifications and changes as fall within the true spirit and scope of the invention.

What is claimed is:

1. A flat cable comprising:
    (a) a plurality of elongated conductive components each individually surrounded with an outer layer of a first polymeric insulating material; and
    (b) a substrate comprising a second polymeric material capable of heat bonding to the first polymeric material;
    the first polymeric material and the second polymeric material, which may be the same or different, being selected from thermoplastic polymers having a melting point greater than 200° C. and the insulated conductive components being bonded to a surface of the substrate and arranged substantially parallel to each other at a predetermined spacing.

2. A cable in accordance with claim 1, wherein the second polymeric material is selected from the group consisting of ethylene-tetrafluoroethylene copolymers (including terpolymers), ethylene-trichlorofluoroethylene copolymers, tetrafluoroethylene-perfluoroalkoxy vinyl ether copolymers, polyamides, aromatic polyamides, polyimides, polyethylene terephthalate and polybutylene terephthalate.

3. A cable in accordance with claim 1, wherein at least one of said conductive components comprises an electrical conductor.

4. A cable in accordance with claim 3, wherein at least one of said conductive components comprises a single metal strand.

5. A cable in accordance with claim 3, wherein at least one of said conductive components comprises a twisted pair.

6. A cable in accordance with claim 3, wherein at least one of said conductive components comprises a coaxial cable.

7. A cable in accordance with claim 1, wherein at least one of said conductive components comprises an optical fiber.

8. A cable in accordance with claim 1, wherein said first polymeric material is independently selected from the group consisting of ethylene-tetrafluoroethylene copolymers (including terpolymers), ethylene-trichlorofluoroethylene copolymers, aliphatic polyamides, aromatic polyamides, polyimides, polyarylene ethers, polyethylene terephthalate, and polybutylene terephthalate.

9. A cable in accordance with claim 1, wherein said second polymeric material is independently selected from the group consisting of polyethylene terephthalate, poly(butylene terephthalate), ethylene-tetrafluoroethylene copolymers (including terpolymers), ethylene-trichlorofluoroethylene copolymers, polyamides, aromatic polyamides, and polyimides.

10. A cable in accordance with claim 1, having a first and a second edge and comprising n parallel insulated conductors, where n is an integer ranging from 2 to 100;
    wherein a first conductor is the nearest conductor to the first edge of the cable and a nth conductor is the nearest conductor to the second edge; and
    wherein the center to center spacing between any two adjacent conductors and the cumulative spacing between a first conductor and a nth conductor is held to within 1% of the desired set spacing therebetween along a length of flat cable equal to at least 50 feet (1524 cm).

11. A cable in accordance with claim 1, wherein at least one of said first and said second polymeric materials are at least partly crystalline and have a melting point greater than 225° C.

12. A cable in accordance with claim 1, wherein both of said first and said second polymeric materials are at least partly crystalline and have a melting point greater than 225° C.

13. A flat cable comprising:
    (a) a plurality of elongated conductive components each individually surrounded with outer layer of a first polymeric insulating material; and
    (b) a substrate comprising a second polymeric material capable of bonding to the first polymeric material and having a thickness less than 2.5 mils (less than 98 microns);
    (c) the first polymeric material and the second polymeric material, which may be the same or different, being selected from thermoplastic polymers;
    the insulated conductive components being bonded to a surface of the substrate and arranged substantially parallel to each other at a predetermined spacing.

14. A cable in accordance with claim 13, wherein the second polymeric material is selected from the group consisting of polyvinyl chloride, polyethylene, polyethylene terephthalate, poly(butylene terephthalate), vinylidene fluoride homopolymers and copolymers, ethylene-tetrafluoroethylene copolymers (including terpolymers), ethylene-trichlorofluoroethylene copolymers, tetrafluoroethylene-perfluoroalkoxy vinyl ether copolymers, polyamides, aromatic polyamides, aliphatic polyimides, and polyesters.

15. A cable in accordance with claim 13, wherein at least one of said conductive components comprises an electrical conductor.

16. A cable in accordance with claim 15, wherein at least one of said conductive components comprises a single metal strand.

17. A cable in accordance with claim 15, wherein at least one of said conductive components comprises a twisted pair.

18. A cable in accordance with claim 15, wherein at least one of said conductive components comprises a coaxial cable.

19. A cable in accordance with claim 13, wherein at least one of said conductive components comprises an optical fiber.

20. A cable in accordance with claim 13, having a first and a second edge and comprising n parallel insulated conductors, where n is an integer ranging from 2 to 100;
   wherein a first conductor is the nearest conductor to the first edge of the cable and a nth conductor is the nearest conductor to the second edge; and
   wherein the center to center spacing between any two adjacent conductors and the cumulative spacing between the first conductor and the nth conductor is held to within 1% of the desired set spacing therebetween along a length of flat cable equal to at least 24 inches (60 cm).

21. A cable in accordance with claim 13, wherein the polymeric substrate has a thickness of from 0.25 to 2.4 mils (10 to 95 microns).

22. A method of fabricating a flat cable which comprises;
   (a) arranging a plurality of elongated conductive components each being individually surrounded by a layer of a first polymeric material, and each being substantially parallel to one another;
   (b) providing a substrate comprising a second polymeric material mounted on a surface of a support layer peelably adhered to the polymeric substrate, the support layer comprising a material that is dimensionally stable at a selected temperature at which temperature the substrate and the first polymeric material can be caused to heat bond to one another;
   (c) heating at least one of the first polymeric material or the substrate to the selected temperature;
   (d) bringing the first polymeric material into contact with the substrate;
   (e) cooling the resulting assembly;
   (f) peelingly removing the support layer from the assembly.

23. A method according to claim 22, wherein the first and second polymeric materials are each ethylene-tetrafluoroethylene copolymer, the support layer is aluminum foil and there is an adhesive layer between the support layer and the polymeric substrate.

24. A flat cable produced by the method comprising:
   (a) arranging a plurality of elongated conductive components each being individually surrounded by a layer of a first polymeric material, and each being substantially parallel to one another;
   (b) providing a substrate comprising a second polymeric material mounted on a surface of a support layer peelably adhered to the polymeric substrate, the support layer comprising a material that is dimensionally stable at a selected temperature at which temperature the substrate and the first polymeric material can be caused to heat bond to one another;
   (c) heating at least one of the first polymeric material or the substrate to the selected temperature;
   (d) bringing the first polymeric material into contact with the substrate;
   (e) cooling the resulting assembly;
   (f) peelingly removing the support layer from the assembly.

25. A flat cable produced by the method of claim 24 wherein the first and second polymeric materials are each ethylenetetrafluoroethylene copolymer, the support layer is aluminum foil and there is an adhesive layer between the support layer and the polymeric substrate.

26. A flat cable produced according to the method of claim 24 wherein the support layer is aluminum.

27. The flat cable of claim 26, having a first and a second edge and comprising n parallel insulated conductors, where n is an integer ranging from 2 to 100;
   wherein a first conductor is the nearest conductor to the first edge of the cable and a nth conductor is the nearest to the second edge; and
   wherein the center to center spacing between any two adjacent conductors and the cumulative spacing between a first conductor and a nth conductor is held to within 1% of the desired selected spacing therebetween along a length of flat cable equal to at least 24 inches (60 cm).

28. A method of preparing a flat cable comprising a plurality of elongated conductive components, each component being individually surrounded by a layer of a first polymeric material that is bonded to a polymeric substrate and having a preselected bond strength thereto, which comprises:
   (a) arranging the plurality of elongated conductive components each individually surrounded by a layer of a first polymeric material, substantially parallel to one another;
   (b) providing a polymeric substrate mounted on a surface of a support layer peelably adhered to the polymeric substrate, the support layer comprising a material that is dimensionally stable at a selected temperature at which the substrate and the first polymeric material can be caused to adhere to one another;
   (c) heating the conductors or the substrate or both to the selected temperature;
   (d) bringing the conductors into contact with the substrate at a predetermined pressure;
   (e) cooling the resulting assembly;
   (f) removing the support layer from the assembly, whereby the insulated conductors manifest the preselected bond strength to the polymeric substrate.

29. A flat cable produced by the method comprising a plurality of elongated conductive components, each component being individually surrounded by a layer of a first polymeric material that is bonded to a polymeric substrate and having a preselected bond strength thereto, which comprises;
   (a) arranging the plurality of elongated conductive components each individually surrounded by a layer of a first polymeric material, substantially parallel to one another;
   (b) providing a polymeric substrate mounted on a surface of a support layer peelably adhered to the polymeric substrate, the support layer comprising a material that is dimensionally stable at a selected temperature at which the substrate and the first polymeric material can be caused to adhere to one another;
   (c) heating the conductors or the substrate or both to the selected temperature;
   (d) bringing the conductors into contact with the substrate at a predetermined pressure;
   (e) cooling the resulting assembly;
   (f) removing the support layer from the assembly.

30. The flat cable of claim 29, having a first and a second edge and comprising n parallel insulated conductors, where n is an integer ranging from 2 to 100;

wherein a first conductor is the nearest conductor to the first edge of the cable and a nth conductor is the nearest to the second edge; and wherein the center to center spacing between any two adjacent conductive conductors of the flat cable and the cumulative spacing between a first conductor and a nth conductor is held to within 1% of the desired selected spacing therebetween along a length of flat cable equal to at least 24 inches (60 cm).

31. A cable in accordance with claim 13, wherein said second polymeric material is independently selected from the group consisting of polyvinyl chloride, polyethylene, polyethylene terephthalate, poly(butylene terephthalate), vinylidene fluoride homopolymers and copolymers, ethylene-tetrafluoroethylene copolymers (including termpolymers), ethylene trichlorofluoroethylene copolymers, tetrafluoroethylene-perfluoroalkoxy vinyl ether copolymers, polyamides and aromatic polyamides and polyimides.

32. A cable in accordance with claim 1 comprising a support layer peelably adhered to said substrate.

* * * * *

UNITED STATES PATENT AND TRADEMARK OFFICE
CERTIFICATE OF CORRECTION

PATENT NO. : 5,327,513
DATED : July 5, 1994
INVENTOR(S) : Nguyen et al

It is certified that error appears in the above-indentified patent and that said Letters Patent is hereby corrected as shown below:

Title page, item [56], replace "Long et al" by --Lang et al.--.

Column 3, line 32, replace "adhere" by --adhered--.

Signed and Sealed this

Fourth Day of October, 1994

Attest:

BRUCE LEHMAN

*Attesting Officer*     *Commissioner of Patents and Trademarks*